US007610122B2

(12) United States Patent
Anderson

(10) Patent No.: US 7,610,122 B2
(45) Date of Patent: Oct. 27, 2009

(54) MOBILE STATION FOR AN UNMANNED VEHICLE

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 304 days.

(21) Appl. No.: 11/204,571

(22) Filed: Aug. 16, 2005

(65) Prior Publication Data

US 2007/0042803 A1 Feb. 22, 2007

(51) Int. Cl.
*G06F 19/00* (2006.01)
(52) U.S. Cl. .......................... 701/2; 700/179; 700/175; 700/169; 180/324; 180/331; 455/556.1
(58) Field of Classification Search .................. 701/2; 455/556.1; 700/179, 175, 169; 180/324, 180/331; 318/568.12; *G06F 19/00*
See application file for complete search history.

(56) References Cited

U.S. PATENT DOCUMENTS

| 4,679,152 | A | | 7/1987 | Perdue .......................... 701/23 |
| 5,383,500 | A | | 1/1995 | Dwars et al. .................. 141/98 |
| 5,483,440 | A | * | 1/1996 | Aono et al. .................... 700/56 |
| 5,870,686 | A | | 2/1999 | Monson ......................... 701/1 |
| 5,959,423 | A | * | 9/1999 | Nakanishi et al. ......... 318/568.12 |
| 5,974,348 | A | * | 10/1999 | Rocks ........................... 701/28 |
| 6,417,641 | B2 | * | 7/2002 | Peless et al. ................ 318/580 |
| 6,532,404 | B2 | | 3/2003 | Colens ......................... 700/262 |
| 7,010,367 | B2 | * | 3/2006 | Koch et al. .................... 700/85 |
| 7,445,078 | B2 | * | 11/2008 | Dolesh et al. ............... 180/324 |
| 2002/0193906 | A1 | * | 12/2002 | Sugiyama et al. ........... 700/188 |
| 2003/0130758 | A1 | * | 7/2003 | Hirano et al. ............... 700/182 |
| 2003/0187560 | A1 | * | 10/2003 | Keller et al. ................. 701/50 |
| 2004/0158355 | A1 | | 8/2004 | Holmqvist et al. ........... 700/245 |
| 2005/0216112 | A1 | * | 9/2005 | Huang et al. ................ 700/101 |
| 2005/0273197 | A1 | * | 12/2005 | Glenn et al. ................. 700/245 |

FOREIGN PATENT DOCUMENTS

JP 02069633 A * 3/1990

OTHER PUBLICATIONS

Lund, E. and Christy, C. Using Electrical Conductivity to Provide Answers for Precision Farming. First International Conference on Geospatial Information in Agriculture and Forestry, Orlando, FL [online]. 1998 [retrieved on Aug. 9, 2005]. Retrieved from the Internet: <URL: http://www.veristech.com/pdf_files/PAPR1erimfnl.pdf>.
Agricultural Research Service. New Surveillance Device Uncovers Insects [online]. May 2001 [retrieved on Jul. 27, 2005]. Retrieved from the Internet: <URL: http://www.cornandsoybeandigest.com/news/soybean_new_surveillance_device/>.

(Continued)

*Primary Examiner*—Tuan C To

(57) ABSTRACT

A mobile station for an unmanned vehicle comprises a vehicular storage area for storing a vehicle during transit or at rest. A first wireless transceiver communicates a status or command between the vehicle and the mobile station during at least one of vehicular deployment and rest. A station controller manages a management plan of the vehicle comprising at least one of retooling the vehicle, loading a payload on the vehicle, and recharging or refueling of the vehicle.

17 Claims, 13 Drawing Sheets

OTHER PUBLICATIONS

Mankin, R.; McCoy, C.; Flanders, K.; Brandhorst, J.; Crocker, R.; and Shapiro, J. Methods for Acoustic Detection of Insect Pests in Soil. Proceedings of the Soil Science Society of America Conference on Agroacoustics, Third Symposium, Buoyoucos, MS [online]. Nov. 1998 [retrieved on Jul. 27, 2005]. Retrieved from the Internet: <URL: http://cmave.usda.ufl.edu/~rmankin/agroacoust3/agroacoust3pp3-8.htm>.

Shuxian, L. and Hartman, G. Molecular Detection Fusarium Solani F. Sp. Glycines in Soybean Roots and Soil [online]. Jan. 2004 [retrieved on Jul. 26, 2005]. Retrieved from the Internet: <URL: http://www.ars.usda.gov/research/publications/publications.htm?seq_no_115=156690>.

Riede, K. Acoustic Monitoring of Orthoptera and its Potential for Conservation. Journal of Insect Conservation, vol. 2 (1998), pp. 217-223.

* cited by examiner

US 7,610,122 B2

MOBILE STATION FOR AN UNMANNED VEHICLE

FIELD OF THE INVENTION

This invention relates to a mobile station for an unmanned vehicle.

BACKGROUND OF THE INVENTION

In developed regions, such as the United States and Western Europe, labor costs for manning agricultural machines is a significant factor in crop production costs. If unmanned equipment are sufficiently reliable and require only minimal maintenance, the contribution of labor costs to total crop production costs may be reduced by the deployment of unmanned vehicles that perform crop production tasks with minimal or no human intervention. Thus, there is a need for a mobile station that supports the deployment of unmanned vehicles to perform crop production tasks or other agricultural tasks.

SUMMARY OF THE INVENTION

A mobile station for an unmanned vehicle comprises a storage area for storing a vehicle during transit or at rest. A wireless communications device communicates a status or command between the vehicle and the mobile station during at least one of vehicular deployment and rest. A station controller manages a management plan of the vehicle comprising at least one of retooling the vehicle, loading a payload on the vehicle, and recharging or refueling of the vehicle.

DESCRIPTION OF THE PREFERRED EMBODIMENT

As used herein, an integral management plan may refer to an agronomic management plan, a general management plan, or both. The general management plan of the vehicle comprises at least one of retooling the vehicle, loading a payload on the vehicle, and recharging or refueling of the vehicle within any field of application (e.g., agriculture, construction, forestry, or military applications. The agronomic management plan relates to applying agronomic or agricultural data or the interpretation or processing of such data to soil or crops. The agronomic management plan may involve a determination of a crop input, seed, or other agronomic input associated with planting, growing, harvesting, or otherwise management a crop or a precursor thereto. The agronomic management plan may comprise a component of the integral management plan.

Figure 1:
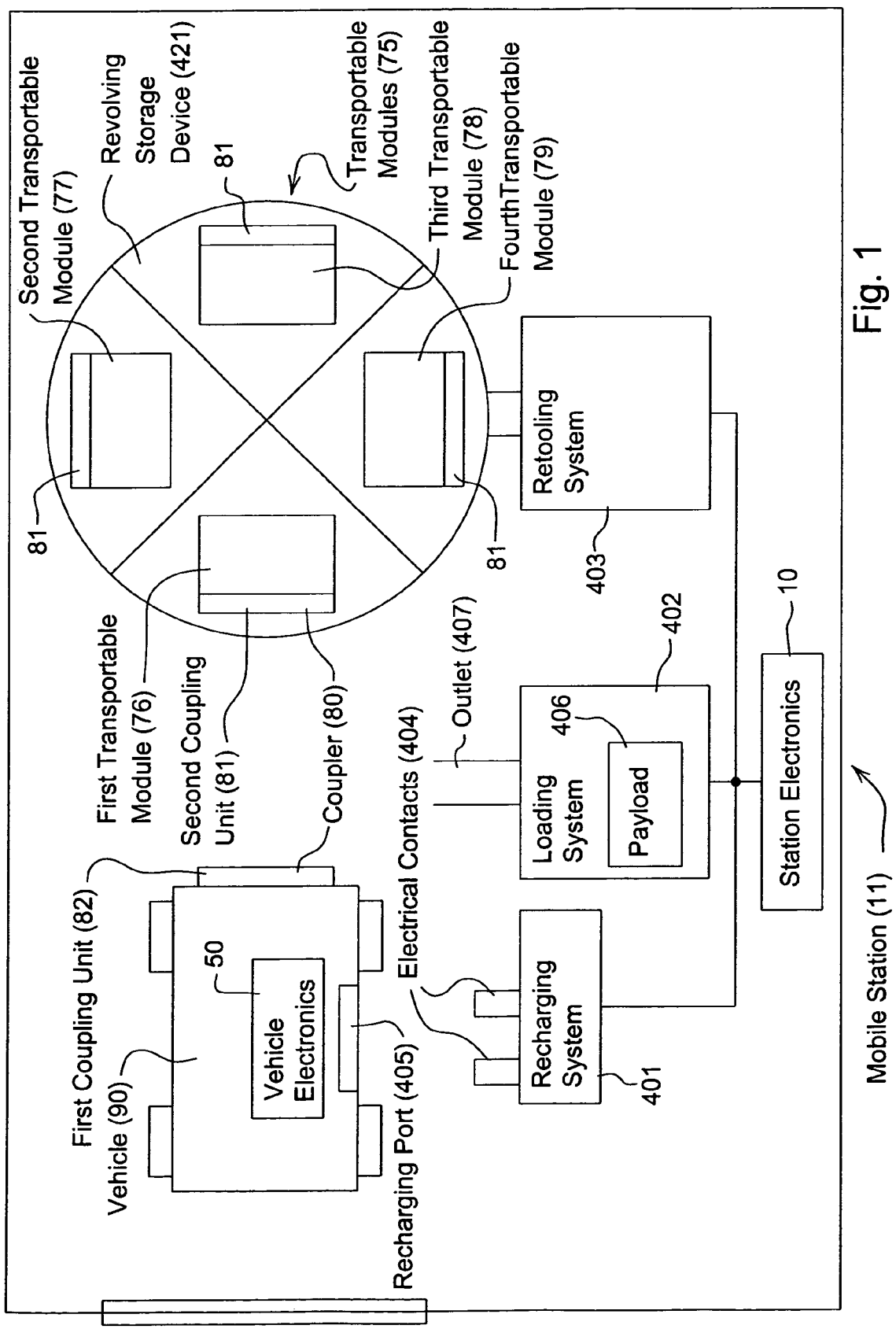
FIG. 1 is a top view of one embodiment of a mobile station with the roof cut away to better reveal the contents of the mobile station.

In accordance with the embodiment of FIG. 1, the mobile station 11 houses a vehicle 90, a recharging system 401, a loading system 402, a revolving storage device 421, a retooling system 403, and station electronics 10. The station electronics 10 may communicate with the recharging system 401, the loading system 402, and the retooling system 403. The retooling system 403 is coupled to a revolving storage device 421.

The vehicle 90 may comprise an unmanned vehicle, autonomous mobile equipment (AME), or intelligent mobile equipment (IME). The vehicle 90 comprises vehicle electronics 50. In one embodiment, the vehicle 90 is secured to an interior, frame or structural component of the mobile station 11 during transit of the mobile station 11.

The revolving storage device 421 may store one or more transportable modules 75. A transportable module 75 comprises a payload, a payload associated with a container, a crop input, a crop input associated with a container, a tool, or an implement. The implement may comprise any agricultural implement, construction implement, turf care implement, a scientific measurement device, or any military implement. For example, the scientific measurement device may comprise a soil conductivity mapping system, another agricultural testing device, radiation sensor (e.g., a Geiger counter), a biological testing device (e.g., biological contamination or weapon detector), and a soil tester for bio-hazards or toxins. A soil conductivity mapping system includes a transmitter that transmits an electromagnetic signal into soil via a transmitting probe and a receiver with a receiving probe spaced apart from the transmitting probe to receive the transmitted electromagnetic signal and measure soil conductivity. The soil conductivity mapping system may produce a map of spatial variability of soil conductivity, provided that each measurement is indexed or referenced to a location of the probes via a location-determining receiver (e.g., a Global Positioning System receiver). The loading system 402 may be empty or may store one or more payloads 406. The station electronics 10 facilitates management of the vehicle 90, a payload 406 (if any), and one or more transportable modules 75 (e.g., implements).

The mobile station 11 may be configured such that its exterior size and shape (and other specifications) conform generally to those of a shipping container (e.g., an intermodal shipping container) to facilitate transportation of the mobile station 11 from one destination (e.g., field) to another via truck, ship, plane, barge, train, or other means of transportation. The mobile station 11 may have walls, support members, or other design features that comply with structural specifications or applicable standards for shipping containers. The mobile station 11 and its vehicle 90 may be deployed for one or more tasks for a given geographic area (e.g., field) such as tilling, planting, seeding, spraying, cultivating, harvesting, or other agricultural tasks. In one illustrative mode of deployment, if the vehicle 90 is equipped with a combine or harvester as a transportable module 75, the mobile station 11 and vehicle 90 are first transported to a field in the southern U.S. at a southern harvest time and moved northward to fields with later (i.e., more northerly) harvest times. In another illustrative mode of deployment, the mobile station 11 and its vehicle 90 may be stationed in regions with political instability, war, problematic security, land disputes, where risk to the personal safety of a farmer, worker or military personnel may be mitigated or reduced by the use of unmanned equipment.

In general, the mobile station 11 comprises one or more of the following areas: (a) a vehicular storage area (e.g., storage bay), (b) a payload loading area, (c) a retooling area and (d) a refueling/recharging area. However, any two or more of the areas may overlap fully or partially. For instance, the payload loading area and the retooling area may overlap or be coextensive spatially.

The vehicular storage area has an adequate spatial area to store one or more vehicles during transit. The floor, walls, or both of the station 11 may have hooks or other fasteners for securing tie-downs, chains, rope, cable or other retention devices to retain the vehicle 90 during transit or shipment of the mobile station 11.

The payload loading area of the mobile station 11 is associated with a loading system 402. The loading system 402 includes a storage area for storing payload 406 (e.g., in bulk) in a fixed container or in a transportable module 75 (e.g., a transportable container). The storage area or transportable container stores a payload for disbursement in a designated field in accordance with management plan (e.g., an agricultural management plan). The payload can be transferred to the vehicle by loading an integral vehicular container of the vehicle 90 with the payload (e.g., from a fixed container at the station 11), or by coupling a transportable module 75 (e.g., a modular container which is at least partially filled with a payload) to the vehicle 90.

The loading system 402 may comprise any of the following: a pneumatic loading system, an auger loading system, a belt loading system, a gravity-fed loading system, or other mechanical conveyer for loading a payload 406 from the storage area to a vehicle 90 or transportable module 75 associated with the vehicle 90. For example, in a gravity fed loading system, a fixed container containing seed, a crop input or other payload may be elevated above a vehicular container of the vehicle 90 or its implement (e.g., transportable module 75) to fill the vehicular container with the payload. The fixed container may be associated with an outlet 407 (e.g., chute) with a pneumatically, hydraulically, electromechanically, or mechanically operated flow regulator.

The mobile station 11 along with the vehicle 90 may be used to deliver a payload 406 to a destination or distribute a payload 406 within a field or other work area. The payload 406 may include seed, fertilizer, herbicides, fungicides, miticides, pesticides, water, nutrients, trace minerals, nitrogen, potassium, phosphorus, chemicals, or other crop inputs. Further, for military operations, the payload may comprise food, military supplies, munitions, or weapons.

In an alternative embodiment, payload may comprise the harvested crop from a field. The vehicle 90 may cooperate with the mobile station 11 to harvest the crop. In one configuration the vehicle 90 might transfer harvested grain from the vehicle 90 to one or more harvested crop containers for pick-up and transport. It should be noted that harvested material may be transferred from the vehicle 90 to the container by an implement that comprises one or more of the following: a combine, a harvester, a picker, a pneumatic conveyer, a conveyer belt, an auger, a grain cart, or the like. The harvested crop containers may be collapsible or foldable containers that are assembled within the mobile station 11, or any other containers (e.g., intermodal shipping containers for grain) that are delivered to the field.

The retooling area of the mobile station 11 contains a resting place for one or more transportable modules 75, such as implements or tools. The retooling area may also serve as a resting place for a transportable container as a transportable module 75 that comprises an implement and a payload (e.g., crop input). The transportable modules 75 may be coupled or decoupled to the vehicle 90 to accomplish different tasks or to fulfill different management plans.

In one configuration, the transportable modules 75 are stored in an automated retooling system 403 (e.g., a turnstile or lazy susan) for delivering or presenting a transportable module 75 to the vehicle 90 or removing the transportable module 75 from the vehicle. The automated retooling system 403 supports retooling of the vehicle 90 or switching from one implement or tool to another consistent with the tasks to be performed. The implement or tool may be adapted for tilling, planting, cultivating, spraying, harvesting, distributing crop inputs, mowing, irrigating or performing other agronomic tasks. The implement may comprise a plow, a planter, a harrow, a cultivator, a spreader, a harvester, a mower, an irrigation unit, a picker, a combine, a corn detassler, a land mine sweeper, a chopper, a scraper, a grader, a dozer blade, a bucket, a lift or forklift attachment, an agricultural implement, a turf care implement, a construction implement, a mine sweeping implement, a military implement, or the like.

Although the automated retooling system 403 in FIG. 1 comprises a revolving storage device 421 or rotatable dispenser with storage compartments, any other configuration of automated retooling system 403 may be used. For example, a non-rotating storage assembly for an automated retooling system might have movable shelves that are shifted vertically or horizontally to align a particular shelf with a coupling unit of the vehicle, a forklift type mechanism that brings items from any particular stationary shelf to a coupling unit of a vehicle, a winch, crane, or hoist mechanism for raising or lowering transportable modules 75 that are stored in a suspended state from a ceiling or other support of the mobile station, or another arrangement. If a revolving storage scheme is used, the revolving storage assembly may rotate about an axis that is generally perpendicular to the ground, parallel to the ground, or oriented in other ways.

As shown in FIG. 1, the revolving storage device comprises a first storage compartment, a second storage compartment, a third storage compartment, and fourth storage compartment; and rotates about an axis that is generally perpendicular to the ground. Each storage compartment may store a different transportable module 75. For example, the first storage compartment may be associated with a first transportable module 76; the second storage compartment may be associated with a second transportable module 77; the third storage compartment may be associated with a third transportable module 78, and the fourth storage compartment may be associated with a fourth transportable module 79. As illustrated in FIG. 1, the retooling system 403 features a revolving storage device 421 (e.g., lazy susan) that can rotate transportable modules 75 to a location immediately in front, behind, or otherwise adjacent to the vehicle 90 to attach the transportable module 75 to a corresponding receiving point on the vehicle 90. If any of the storage compartments contain a transportable module 75 that includes a vehicular container at least partially filled with a payload, the retooling area (and automated retooling system 403) may subsume the functions of the payload loading area (and the loading system 402).

Each vehicle 90 includes a first coupling unit 82 and each transportable module 75 comprises a second coupling unit 81. The first coupling unit 82 and the second coupling unit 81 are capable of engaging one another to form a mechanical connection. The first coupling unit 82 and the second coupling unit 81 are collectively referred to as the coupler 80. The first coupling unit 82 and the second coupling unit 82 may be engaged or disengaged mechanically, electrically, hydraulically, electromechanically (e.g., by a solenoid controlled latch), or pneumatically, for example.

In one example, the transportable module 75 (e.g., implement or tool) may be attached or secured to the vehicle 90 by a coupler, wherein a first coupling unit 82 resides on the vehicle 90 and a second coupling unit 81 is mounted on the implement or tool. In general, the relative locations of the vehicle 90 and the transportable module 75 (or the relative locations between the coupling units 82 and 81) are established by optical, ultrasonic, or other sensors (e.g., the optical positioning system 412 of FIG. 3). The vehicle 90, the transportable module 75, or both are moved relative to one another in a way that brings together and engages the first coupling unit 82 to the second coupling unit 81 of the coupler 80. When a particular transportable module 75 that is operably attached to the vehicle is no longer needed (e.g., because a task is complete or aborted), the vehicle 90 re-enters the mobile station 11; the vehicle 90 sends a message to the station electronics 10 or the retooling system 403 to present the vehicle 90 with an empty location (e.g., associated with the revolving storage device 421) for the transportable module 75; the relative locations of the empty storage space are determined; the transportable module 75 is moved to the empty location; and the first coupling portion 82 is disengaged from the second coupling portion 81. The vehicle may then coordinate the retooling system 403 or station electronics to receiver another transportable module 75, or otherwise.

The recharging/refueling area of the mobile station 11 supports the transfer of electrical energy or chemical energy of a combustible fuel to a vehicle. The recharging/refueling area may differ depending on whether the vehicle is propelled by an internal combustion engine, an electric motor, or both. If the vehicle 90 is propelled by an internal combustion engine or a hybrid, the mobile station 11 supports refueling of the vehicle 90 with a combustible fuel (e.g., gas, diesel, hydrogen or propane). A hybrid refers to the combination of an internal combustion engine and an electric drive for vehicular propulsion, for instance. If the vehicle 90 is propelled by an electric motor, the mobile station 11 supports recharging or fully charging of an electrical energy storage device (e.g., a battery or batteries) associated with the vehicle 90.

The details of the repowering area will depend on the power source(s) used by the vehicle 90 associated with a particular mobile station 11. If both the vehicle 90 and mobile station 11 are electrically powered, then a recharging system 401 (e.g., a docking station) comprises station electrical contacts 404 (or electrodes) to form an electrical connection between the vehicular contacts of the vehicle 90 and the recharging system 401. Although vehicular electrical contacts can be configured in a myriad of ways, in one configuration the electrical contacts are associated with or integrated into a recharging port 405. The vehicular contacts are connected or coupled to an electrical storage device on the vehicle 90, and an electrical circuit is formed between the recharging system 401 and the electrical storage device during the recharging process.

To initiate the recharging process for an electrically driven vehicle, the vehicle 90 would enter the mobile station 11 to conduct the recharging in a secure, controlled environment. The vehicular electrical contacts or recharging port 405 on the vehicle 90 are identified. The vehicle 90 moves the recharging port 405 or vehicular contacts into relative position with respect to the station electrical contacts 404 to establish an appropriate electrical connection for recharging of an electrical storage device (e.g., batteries) on board the vehicle 90. In one configuration, after the recharging is completed, the electrical contacts would be retracted and the vehicular recharging port 405 of the vehicle 90 would be resealed to protect against the elements. Ventilation may need to be provided during repowering so that explosive vapors do not accumulate inside the mobile station 11.

In one embodiment, optical transmitters (e.g., infra-red or near infra-red laser sources) associated with the electrical contacts 404 and optical detectors (e.g., infra-red or near infra-red photo-detectors) associated with the recharging port 405, or vice versa, may be used to detect alignment between the recharging port 405 and the electrical contacts 404. The optical detectors may provide an alignment indicator signal to a controller. For example, the optical transmitters transmit a signal and alignment is achieved when one or more optical detectors receive a maximum amplitude or peak amplitude of the transmitted signal. In one configuration, a controller controls one or more actuators (e.g., electric motors, solenoids, or stepper motors) associated with the vehicle propulsion system of the vehicle or a robotic arm of the recharging system 401 to first sweep a broad path (e.g., in one, two or three spatial dimensions) in an acquisition mode for one or more detectors to acquire the transmitted signal. After the acquisition mode, the controller aligns the recharging port 405 and electrical contacts 404 over a limited range of motion (narrower than the broad path) in one, two or three dimensions based on the detection of the transmitted signal. The controller activates one or more actuators to align the electrical contacts 404 and the recharging port 405 to form an electrical connection. In one embodiment, the recharging system 401 may check polarity of the electrical connection prior to forming an electrical circuit (e.g., activating a switch) between the recharging system 401 and energy storage device of the vehicle to charge the energy storage device (e.g., batteries) of the vehicle via the recharging system 401. The controller may disable the electrical circuit and/or disengage the recharging port 405 and the electrical contacts 401 upon reaching of a time limit, a maximum charge, target charge, or a target state-of-charge of the energy storage device. The state-of-charge of a battery is an indication of the electrical energy stored in a battery at a given time. The state of charge may be expressed as a percentage of the maximum battery capacity. The state of charge may be estimated based on the present open circuit voltage of a battery, the present internal resistance of the battery, and the rated capacity of the battery.

With respect to refueling a vehicle propelled by an internal combustion engine, an automated fuel delivery system (not shown) for liquid fuel would align the fuel receptacle of the vehicle with a fuel nozzle or fuel dispenser of the fuel delivery system. Optical transmitters (e.g., infra-red or near infra-red laser sources) associated with the fuel nozzle and optical detectors (e.g., infra-red or near infra-red photo-detectors) on the fuel receptacle, or vice versa may be used to detect alignment between the fuel receptacle and nozzle and to provide an alignment indicator signal to a controller. For example, the optical transmitters transmit a signal and alignment is achieved when one or more detectors receive a maximum amplitude or peak amplitude of the transmitted signal. A controller controls one or more actuators (e.g., electric motors, solenoids, or stepper motors) to first sweep a broad path in (e.g., in one, two or three spatial dimensions) of the fuel nozzle in an acquisition mode to acquire the transmitted signal by one or more detectors. After the acquisition mode, the controller aligns the fuel receptacle and nozzle over a limited range of motion (narrower than the broad path) in two or three dimensions based on the detection of the transmitted signal. The controller activates one or more actuators to align the fuel nozzle to form a secure connection with seals (e.g., magnetic seals, mechanical seals) or connectors (e.g., threaded connections or quick-release connectors) prior to activating a pump to put a metered amount of fluid into a tank of the vehicle 90. The pump would be deactivated and the connection between the fuel receptacle and the dispenser disengaged upon reaching of a maximum amount of fuel, in a gauge associated with the vehicle 90 tank, the station tank, or a pressure sensor (e.g., hydraulic back-pressure associated with the dispenser). Fluid fuels may comprise gasoline, diesel, ethanol, propane, liquid propane gas or other combustible fuels.

In an alternative embodiment, automated fluid refueling methods could be adapted for gaseous fuels such as hydrogen and methane by adding additional sensor to detect leaks of gaseous fuel in the vicinity of the vehicle 90 or refueling connection. If the vehicle 90 and mobile station 11 are both electrically powered, it may not be necessary for a human to visit the mobile station 11 during the course of the work season to bring any liquid or gaseous fuel. However, if a fluid or gaseous fuel is used, the amount of fuel stored in the mobile station 11 could be monitored and reported to a remote location wireless, wireline, telematics, a communications network (e.g., communications network 24 of FIG. 4), or another communications link in order to generate a work order to bring more fuel to the mobile station 11.

The mobile station 11 may be deployed in at least two modes. A first mode equips the mobile station 11 to handle tasks for substantially an entire growing season. For instance, for the first mode the mobile station 11 may include a collection of different transportable modules 75 and payloads (e.g., crop inputs) to complete a group of the following agricultural tasks: tilling, planting, cultivating, spraying, harvesting, and combining. Under the first mode, at the end of the work season (applicable to construction and turf equipment as well), the mobile station 11 and vehicles 90 would be picked up by a truck for end of season maintenance. Optionally, they could then be sent to the opposite hemisphere for use in its growing season by truck, rail, and sea. This efficient transport is facilitated by using a structure the same size and durability of a containerized freight container.

In contrast, a second mode equips the mobile station 11 to handle specialized tasks or tasks for only a portion of the growing season. For instance, for the second mode, the mobile station 11 may include one of the following transportable modules 75 and any corresponding requisite payload: tilling, planting, spraying, scouting, cultivating, harvesting, and combining.

Figure 2:
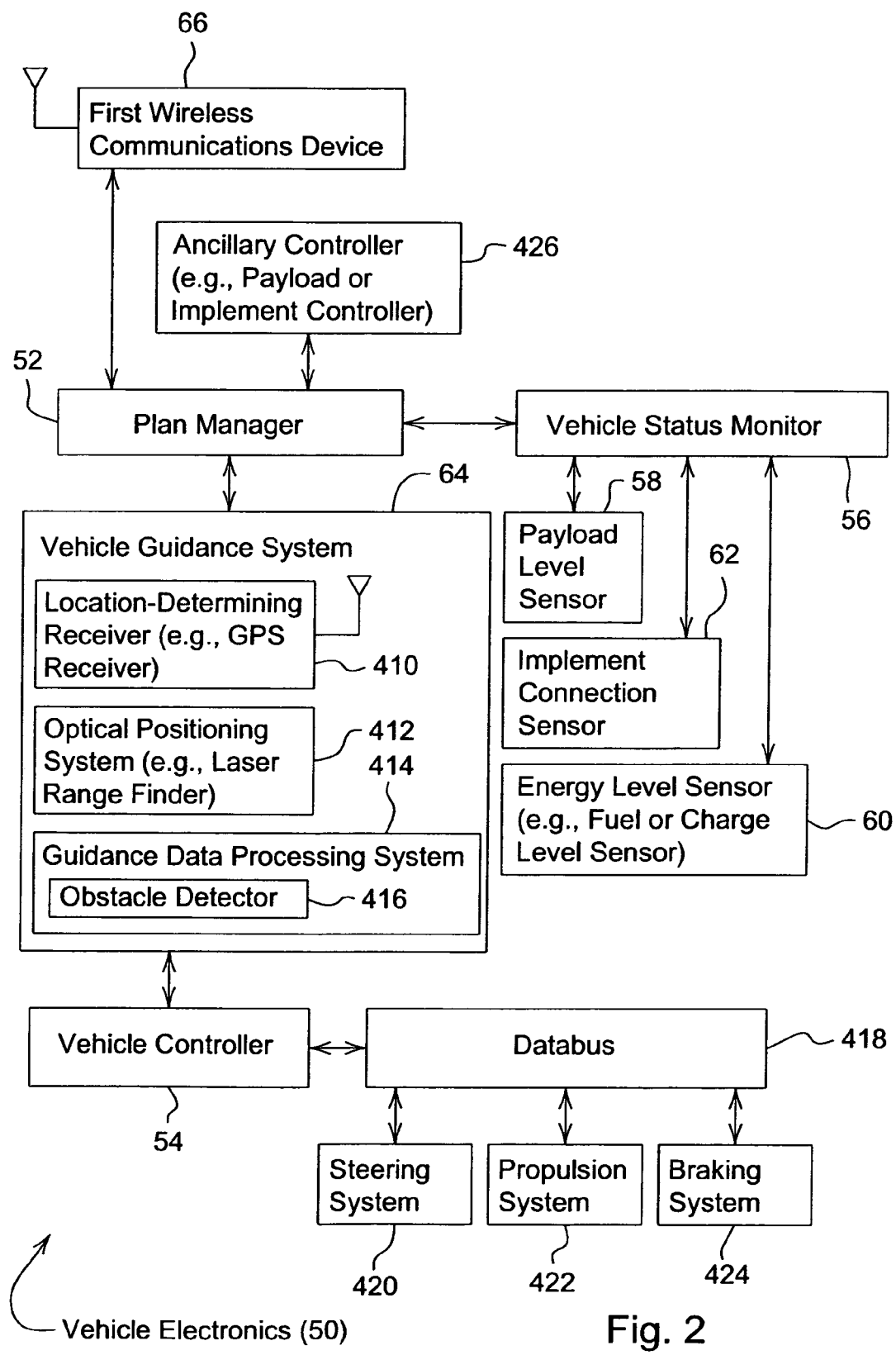
FIG. 2 is a block diagram of one embodiment of vehicle electronics associated with the mobile station of FIG. 1.

In FIG. 2, the vehicle electronics 50 comprise a plan manager 52 that communicates with one or more of the following: a first wireless communications device 66, a vehicular status monitor 56, a vehicle guidance module, and an ancillary controller 426. The vehicular guidance system 64 communicates with a vehicle controller 54. In turn, the vehicle controller 54 is coupled to a steering system 420, a propulsion system 422, and a braking system 424 via a databus 418 or another physical or logical data connection.

The vehicle status monitor 56 may be coupled to a payload sensor 58, an energy level sensor 60, and an implement connection sensor 62. The payload sensor 58 determines a level of the payload on the vehicle 90 at any given time. The payload sensor 58 may indicate when the payload on the vehicle is low, empty or full, for example. Similarly, the energy level sensor 60 indicates a fuel level of fuel for a vehicle with internal combustion engine or the charge level or state of charge for an electrical storage device (e.g., batteries) on the vehicle for an electrically propelled vehicle. The implement connection sensor 52 may determine whether an implement is coupled to the vehicle 90 or what implement (e.g., the implement identifier or transportable module identifier) or an implement that is coupled to the vehicle 90.

The vehicle guidance system 64 may comprise a location-determining receiver 410, an optical positioning system 412, and a guidance data processing module 414. In one embodiment, the location-determining receiver may comprise a Global Positioning System receiver with differential correction. The optical positioning system 412 may comprise an optical or laser range finder that can determine the distance or relative position (e.g., in two or three dimensions) between a reference point on the vehicle and an object. The location-determining receiver 410 may be useful for global navigation and outdoor navigation outside of the mobile station 11. However, the optical positioning system 412 may be used within the interior of the mobile station 11 for appropriate positioning with respect to the vehicular storage area, the payload loading area, the retooling area, and the refueling/recharging area. The guidance data processing module 414 may comprise an obstacle detection module 416 and a general processing module for guiding a vehicle in accordance with a path plan, to avoid obstacles, and to apply data from the location-determining receiver 410 and the optical positioning system 412 in a coordinated and appropriate manner based on the environment of the vehicle 90.

In an alternative embodiment, the vehicle guidance system 64 may comprise a location-determining receiver (e.g., a Global Positioning System receiver with differential correction), a dead-reckoning system, an odometer, an accelerometer, an accelerometer with an integrator, or another position-determining device for determining the location (e.g., coordinates) of the vehicle 90.

Figure 4:
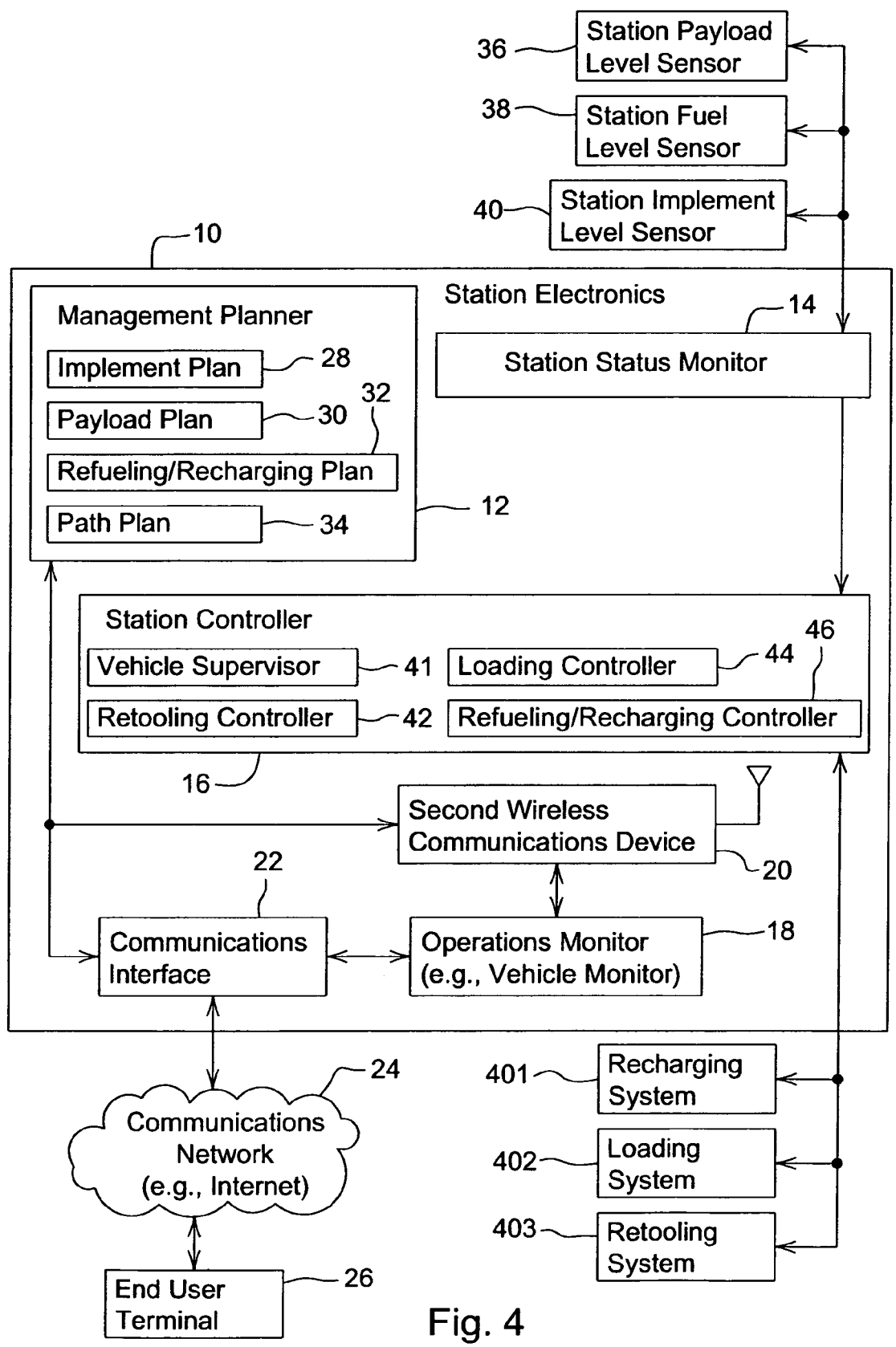
FIG. 4 is a block diagram of one embodiment of station electronics associated with the mobile station of FIG. 1.

The first wireless communications device 66 of the vehicle electronics 50 is capable of communicating with the second wireless communications device 20 of the station electronics 10. For instance, the second wireless communications device 20 of the station electronics 10 may transmit one or more of the following to the first wireless communications device 66: a management task, an implement plan 28 (FIG. 4), a payload plan 30 (FIG. 4), a recharging/refueling plan 32 (FIG. 4), a management plan, a path plan 34 (FIG. 4).

The plan manager 52 interprets and executes a management task, a management plan, an implement plan 28, payload plan 30, or a recharging/refueling plan 32 transmitted to the vehicle 90 electronics 50 via the first wireless communications device 66. Further, the plan manager 52 manages coupling and decoupling of at least one implement to the vehicle to perform a particular task consistent with a management plan (e.g., agricultural management plan). The vehicle controller 54 controls the navigation and operation of the vehicle 90. The guidance data processing module 414 may execute a path plan (e.g., path plan 34 of FIG. 4), such as a point-to-point path plan, a contour path plan, a spiral path plan, a coverage area path plan, and linear path plan of generally parallel rows, or a boustrophedon path. Boustrophedon refers to a pattern or path in which the vehicle 90 moves in opposite directions in adjacent rows that are generally parallel to each other. The vehicle status monitor 56 comprises a payload level sensor 58, an energy level sensor 60, and an implement connection sensor 62. The guidance system 64 may interrupt the path plan or management plan to refuel the vehicle, to recharge the vehicle, to load additional payload, to change or procure a particular implement, or to return to the mobile station 11 (e.g., for maintenance or repair) based on input data from the payload level sensor 58, the energy level sensor 60, and the implement connection sensor 62. The ancillary controller 426 controls the payload or the implement consistent with the management plan, the payload plan, the path plan, and the implement plan.

Figure 3:
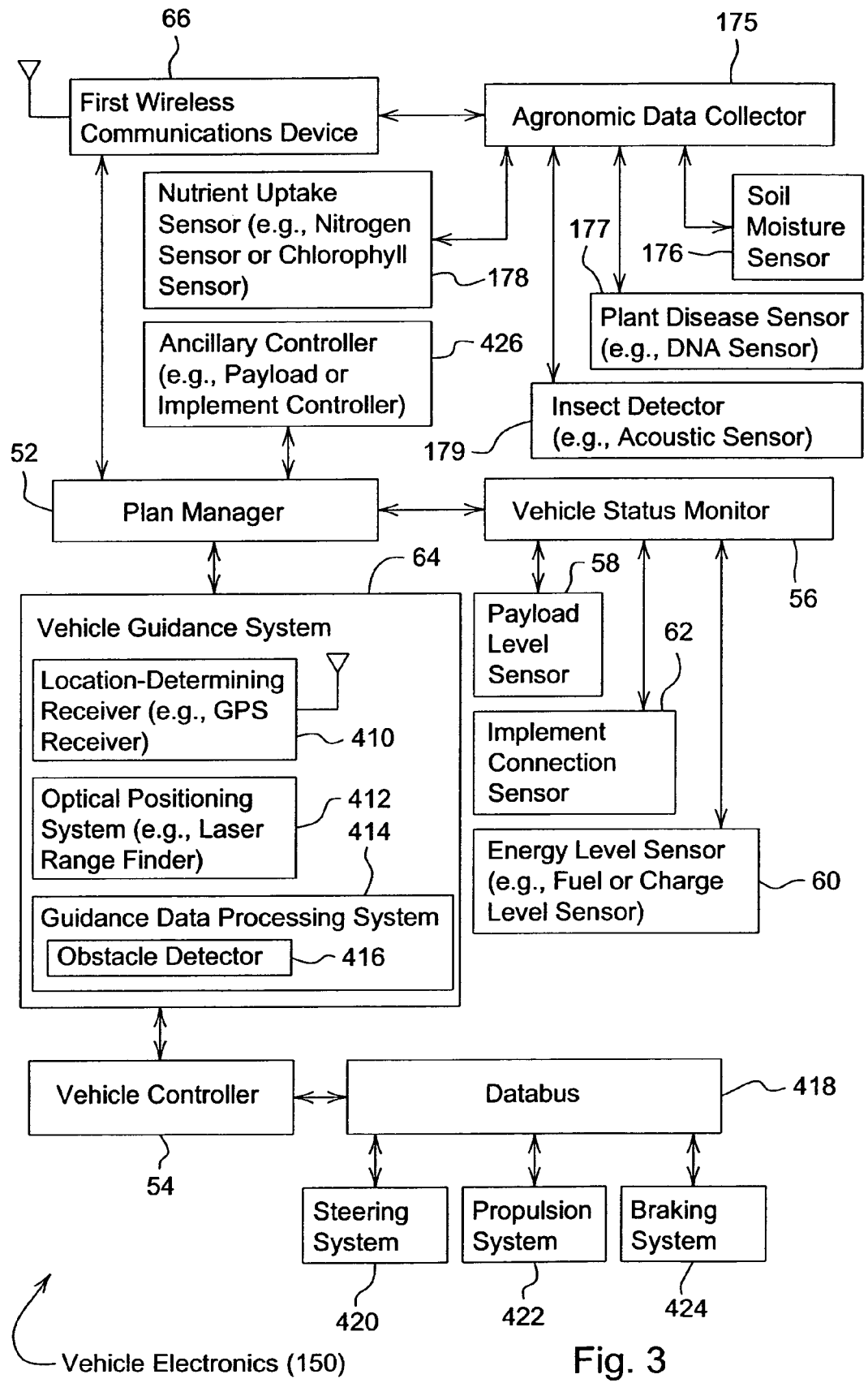
FIG. 3 is a block diagram of another embodiment of vehicle electronics associated with the mobile station of FIG. 1.

The vehicle electronics 150 of FIG. 3 are similar to the vehicle electronics 50 of FIG. 2, except the vehicle electronics 150 of FIG. 3 further include an agronomic data collector 175 and a group of sensors that are capable of communicating with the agronomic data collector 175. The vehicle electronics 150 may be equipped with one or more of the following sensors to determine the status, condition or health of a crop: a soil moisture sensor 176, a plant disease sensor 177, a nutrient uptake sensor 178, and an insect detector 179. Although one or more of the sensors (176, 177, 178, and 179) may be incorporated into a transportable module 75, no such incorporation is necessary if the vehicle electronics 150 are equipped with such sensors as shown in FIG. 3.

The collected soil moisture measurements, nitrogen measurements, nutrient measurements, and genetic measurements may be associated with location data (e.g., coordinates) from the location-determining receiver 410. As the data is collected, a location-determining receiver 410 or vehicle guidance system 64 may augment each collected measurement or group of collected measurements with corresponding location data. The measurement data and location data may be organized as a database, a chart, a look-up table, a map, a file, or otherwise. The measurement data and location data may be collectively referred to as the measurement data. The agronomic data collector 175 may transmit the collected data to the station electronics via the first wireless communications device and second wireless communications device. At the station electronics 10, the management planner 12 (FIG. 4) or other data processor determines a management plan (e.g., an agronomic prescription) based on the collected data.

The soil moisture sensor 176 may measure volumetric water content or relative water content of the soil by transmission and reception of electromagnetic energy into the soil via two or more metallic probes separated by known distances. The vehicle 90 may insert the probes or electrodes into the soil to a desired depth. An electromagnetic wave is transmitted at a transmission time from a transmitting probe and received at a reception time at the receiving probe, which depends upon the known separation between the probes and the dielectric permittivity of the soil that is indicative of water content in the soil. Water has a higher dielectric permittivity than air or soil particles.

The nutrient uptake sensor 178 may comprise a chlorophyll sensor, a soil nitrogen sensor, a nitrogen uptake sensor, or soil nutrient sensor. The nutrient uptake sensor 178 may use leaf color information to estimate nitrogen level of plant leaves or tissue or nitrate ion readings from soil or plant tissue samples.

A nitrate or nitrogen sensor may be used to measure the nitrogen or nitrate content in vegetation tissue (e.g., pressed leave samples gathered from a field) or soil sample. The nitrate or nitrogen sensor may use an ion electrode technique to measure the positive electrical charge (e.g., conductivity of chemically active or free nitrate ions) associated with the concentration of nitrate ions in extracted liquid from pressed vegetation tissue or from soil samples. In one example, the extracted liquid or soil samples are chemically treated to free the nitrate ions from the sample prior to conducting the nitrogen level measurement.

A chlorophyll sensor may transmit light over a first frequency range (e.g., approximately around 428,570 GHz) that tends to be absorbed by plant tissue (e.g., leaves of crop) containing chlorophyll and transmit a second frequency range that tends to be reflected by the plant tissue. The first frequency range and the second frequency range are limited to one or more of the following spectrum: visible light, ultraviolet light, infrared light, and near infra-red light. A detector measures the amplitude of the reflection within the first frequency range and the second frequency range to estimate the chlorophyll content of the plant tissue. The chlorophyll sensor may further include a compensator for compensating for differences in the magnitude of ambient light when multiple measurements are taken.

The plant disease sensor 177 may comprise a collector for collecting genetic material, preparing the collected genetic material, and a sensor for detecting certain proteins, gene sequences, or deoxyribonucleic acid (DNA) sequences indicative of a plant pathogen (e.g., bacteria, fungus or virus.) For instance, the sensor may comprise a device for conducting a polymerase chain reaction (PCR) to detect nucleic acid or an identifiable DNA sequence from a pathogen (e.g., for detection of crop pathogens such as Asian Soybean Rust).

In an alternate configuration, the plant disease sensor 177 may comprise a collector for collecting plant material and capturing magnified color images and non-magnified color images for transmission to a lab, agronomist or botanist for further examination and diagnosis. The plant disease sensor 177 may comprise one or more lens, a microscope, or digital microscope for collecting such magnified images of plant leaves or tissue. The agronomic data collector 175 would instruct the first wireless communications device 66 to transmit the images to a lab address or botanist address via the station electronics 10 and the communications network 24.

The insect detector 179 may comprise an acoustic sensor for listening for insect activity. The acoustic sensor collects sounds to identify the presence or absence of insects. The acoustic sensor may comprise a microphone or transducer coupled to an amplifier. The amplifier is associated with frequency selective filtering. For example, the frequency selective filtering may pass frequencies within 1 Hz to 500 Hz. The filtered or collected sounds may be fed into an analog-to-digital filter to convert the filtered sounds into digital data that may be filtered to eliminate background noise and to identify the presence or absence of insects. Background noise (e.g., automobiles, wind, human speech) may occur over a broader spectrum than insect noises from feeding and movement of insects. A data processor coupled to the output of the analog-to-digital filter may evaluate a frequency range or frequency response (e.g., frequency of peak amplitude or signal strength) of the filtered sounds and the temporal spacing between the filtered sounds with reference to reference insect frequency ranges and reference temporal spacing (for corresponding insects) to identify the presence or absence of particular insects.

In FIG. 4, the station electronics 10 generally comprises a management planner 12, a station status monitor 14, a station controller 16, an operations monitor 18, a second wireless communications device 20, and a communications interface 22.

The management planner 12 may determine a management plan, an implement plan 28, a payload plan 30, a refueling/recharging plan 32, and a path plan 34. The management planner 12 may receive collected agronomic data from the agronomic data collector 175 or the vehicle electronics 150. The management planner 12 may base the management plan, implement plan, payload plan, refueling/recharging plan, and a path plan on collected agronomic data received from the vehicle electronics 150, from input data provided by the end user terminal 26 via the communications network 24, or from input data provided by other sources (e.g., weather data, agricultural reference data) that are accessible via the communications network 24.

The implement plan 28 identifies a particular implement or implement identifier that is required to execute a corresponding management plan. The payload plan 30 determines the quantity and type of payload that is necessary to execute a particular management plan. The payload may comprise a seed, plant stock, root stock, a plant, or a crop input or plant input. A crop input may include fertilizer, a nutrient, a trace nutrient, nitrogen, phosphorus, potassium, pesticide, herbicide, water, fungicide, plant hormones, or other chemicals or compounds applied to the crop. The refueling/recharging plan 32 estimates the time or distance over which the vehicle 90 can safely operate prior to running out of fuel (for an internal combustion engine) or stored electrical energy (for an electrical propulsion system). The path plan 34 provides a path over which the vehicle 90 can travel.

In an alternative embodiment, the user terminal 26 may transmit a management plan to the mobile station 11. In turn, the mobile station 11 may decompose, stratify or organize the management plan into an implement plan 28, payload plan 30, refueling/recharging plan 32, and path plan 34, or in another format that is capable of processing by the vehicle electronics (50 or 150). The management plan, or its components, are dispatched or transmitted to one or more vehicles 90.

If the management planner 12 is configured to determine a management plan, the management planner 12 may send the vehicle on a scouting mission to collect agronomic information on the crop to determine an appropriate management plan. Illustrative examples of management plans (developed from collected agronomic data in a scouting mission) include the following: (1) if soil moisture in the soil is below a certain minimum threshold over a certain material portion of a field, create a management plan that includes irrigating the certain material portion of the field; (2) if nitrogen or nitrate concentration (in plant tissue or in the soil) is below a certain threshold over a certain portion of a field, create a management plan that includes application of nitrogen, ammonia, or a fertilizer payload; (3) if chlorophyll content of crop vegetation is low and nitrogen or nitrate concentration (in plant tissue in soil) is within a desired range, create a management plan that includes conducting genetic tests (e.g., deoxyribonucleic tests), gathers samples for such tests throughout the field, or create a management plan for disbursing fungicide to material portions of the field where chlorophyll content is low. The genetic tests may be sent to a laboratory for processing rather than handled at the vehicle 90. For instance, a polymerase chain reaction (PCR) method may be used to detect nucleic acid or an identifiable DNA sequence from certain fungal pathogens.

The station controller 16 comprises a retooling controller 42, a loading controller 44, a refueling/recharging controller 46, and vehicle supervisor 41. The retooling controller 42 controls the coupling of transportable module 75 (e.g., implement) to a coupling unit on the vehicle 90, or the decoupling of a transportable module 75 (e.g., implement) to a coupling unit on the vehicle 90. The retooling controller 42 may comprise the duration and timing of when the implement is active on the vehicle 90 and when it is inactive. The retooling controller 42 may further control the settings of the implement or a vehicle 90 associated with the implement.

The loading controller 44 may control the rate and amount of disbursement of a payload (e.g., crop input on a crop or the ground). The rate of disbursement may, but need not, vary over different areas of a field and may be associated with the particular corresponding location of a vehicle 90 at a given time.

The refueling/recharging controller 46 may receive input data or an input signal from an energy level sensor 60 to determine a suitable time for refueling before fuel stored on the vehicle 90 runs out or a suitable time for recharging an energy storage device (e.g., battery) for an electrically propelled vehicle 90 before the energy storage device on the vehicle 90 is substantially depleted. The vehicle 90 supervisor may supervise formation of the management plan, and transmission of the management plan from the station electronics 10 to the vehicle electronics (50 or 150), and oversight of the performance of the vehicle electronics (50 or 150) in executing the management plan. The operations monitor 18 facilitates monitoring of the operations of the vehicle 90, the vehicle electronics (50 or 150), and performance of the path plan 34. The station electronics 10 communicate with the vehicle electronics (50 or 150) via the first wireless communications device 66 and the second wireless communications device 20.

The communications interface 22 facilitates communications over one or more of the following: a transmission line, an electromagnetic communications link, short-range wireless link to a field node, a short-range wireless link to a mesh network; a wireline connection, transmission line, optical cable connection to a public telephone system; a link to a data packet network, an analog or digital communications channel via a mobile or cellular phone network, a satellite link, an Ethernet connection, a WiFi connection, a WiMax connection, and any other transmission line or wireless communications device utilizing radio frequency (RF), optical, or other portions of the electromagnetic spectrum.

WiFi is a wireless networking standard, which may be referred to as 802.11 compliant. WiFi transceivers may be compatible with the 802.11b and 802.11g standards and transmit at 2.4 GHz with orthogonal frequency division multiplexing. The 802,11 b compliant WiFi is theoretically capable of transmitting at a maximum rate of 11 Mbps (Megabits per second), whereas the 802.11a and 802.11g are theoretically capable of transmitting a maximum rate of 54 Mbps. The 802.11 standard is a wireless standard adopted by the Institute of Electrical and Electronics Engineers (IEEE). WiMAX stands for Worldwide Interoperability for Microwave Access and is allows greater bandwidth or transmission capacity than WiFi. WiMAX products conform to the IEEE 802.16 standards.

The communications interface 22 of the station electronics 10 supports communications between the station electronics 10 and an end user terminal 26 via a communications network 24 (e.g., the internet) or another communications line.

The station status monitor 14 comprises a station payload level sensor 36, a station fuel level sensor 38, and a station implement present sensor 40. The station payload level sensor 36 detects a level of one or more particular payloads stored in the station. The station fuel level sensor 38 detects a level (e.g., in gallons or liters) of fuel or the amount of electrical energy stored at the station for refueling or recharging the vehicle 90. The station implement present sensor 40 determines whether a particular implement is present within the station. For example, each implement may have a distinct implement identifier and each implement identifier may be associated with a corresponding resting place or designated area. If the implement is present in its corresponding resting place or designated area, the implement is associated with a first value. However, if the implement is absent from the corresponding resting place or designated area, the implement is associated with a second value.

The mobile station 11 requires an electrical generator or connection to the power grid or other supply of electricity. Examples of power sources for the mobile station 11 and the vehicle 90 include, but are not limited to electricity from nearby power lines, wind towers, solar panels, or fuel cells, or electrical energy derived from mechanical, and/or hydraulic power from an internal combustion engine.

Figure 5:
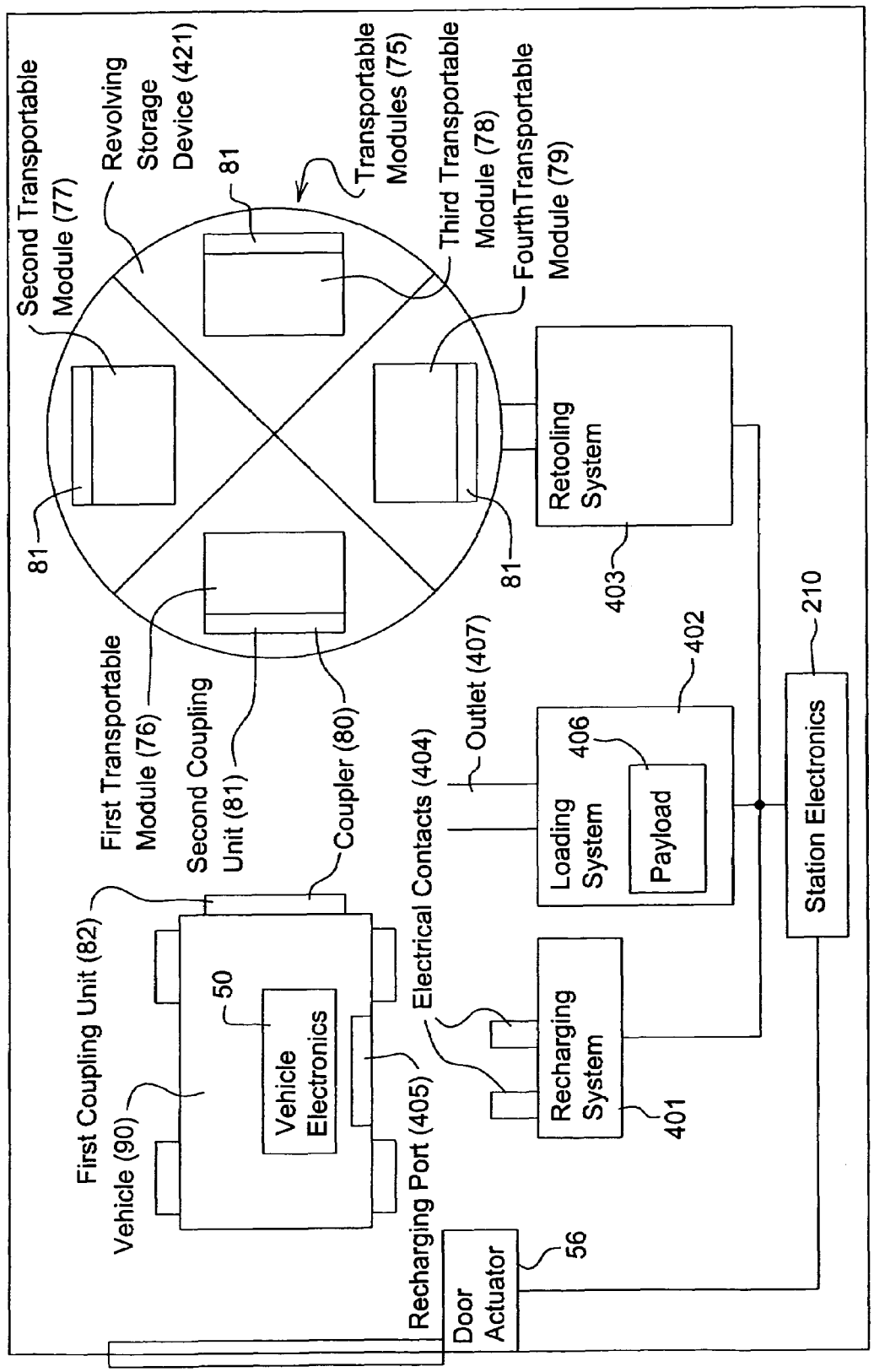
FIG. 5 is a top view of another embodiment of a mobile station with the roof cut away to better reveal the contents of the mobile station.

The mobile station 111 of FIG. 5 is similar to the mobile station 11 of FIG. 1, except the station 111 of FIG. 5 further includes a security manager incorporated into the station electronics 210. Further, the station electronics 210 or security manager is coupled to one or more door actuators 56. Like reference numbers in FIG. 1 and FIG. 5 indicate like elements.

The station electronics 210 or security manager are coupled to a door actuator 56 to control opening and closing of a movable door (e.g., sliding or hinged) associated with the mobile station 111. The door is of sufficient size and shape to allow the vehicle 90 to enter and exit an interior of the station.

Figure 6:
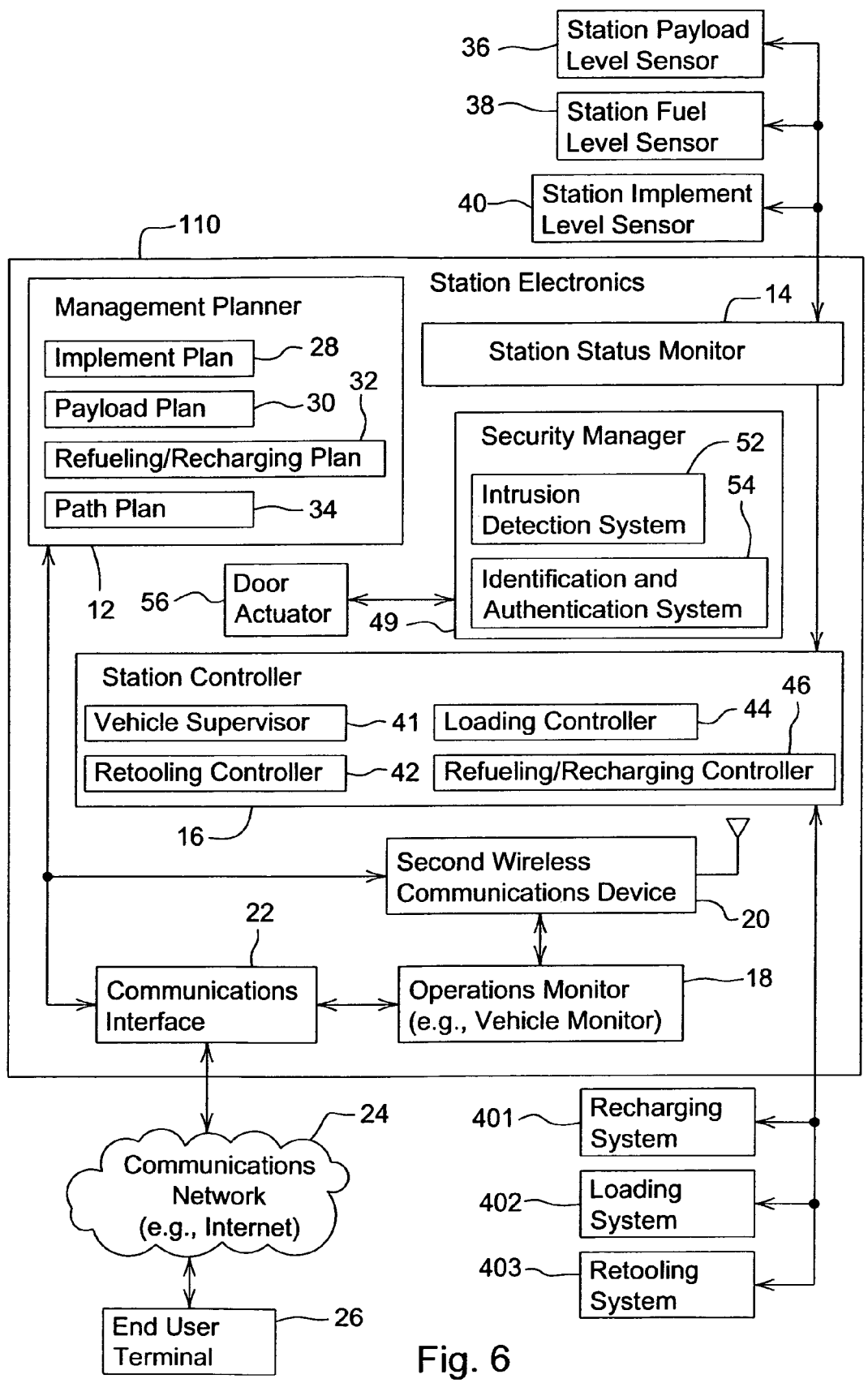
FIG. 6 is a block diagram of one embodiment of station electronics associated with the mobile station of FIG. 7.

As indicated in FIG. 6, the security manager 49 comprises an intrusion detection system 52 and an identification and authentication system 54.

The security manager 49 promotes a secure environment for the vehicle 90 inside the mobile station 111. The intrusion detection system 52 has the ability to detect a person, animal, or machine that may try to gain unauthorized entry when the door is open or closed. The intrusion detection system 52 may comprise one or more motion detectors (e.g., ultrasonic motion detectors) to detect the presence of an intruder within a certain perimeter or outer radius of the mobile station 111. Further, the intrusion detection system 52 may contain contact switches or sensors that are triggered when any door or opening of the mobile station 111 is opened. The intrusion detection system 52 determines whether an intrusion event has occurred and reporting the intrusion event to an end user via a communications network. The intrusion event may comprise a person or entity violating a boundary or perimeter about the mobile station 111.

The identification and authentication system 54 requires identification and authentication of people and/or machines opening it. In one embodiment, identification and authentication system 54 may comprise a radio frequency tag (e.g., RFID) reader that reads a tag mounted on the vehicle or carried by a person. In other embodiments, the identification and authentication system 54 may comprise a receiver or transceiver that receives a coded transmission (e.g., code division multiple access or spread spectrum transmission) from a transmitter or transceiver associated with the vehicle or a portable transmitter or portable transceiver carried by an individual.

While vehicles 90, payloads, and other components can be secured within the mobile station 11. The mobile station 11 is designed to be easily transported and consequently is subject to theft. The location-determining receiver 410 (e.g., Global Positioning System (GPS)) coupled with the communications means can be used to identify unauthorized transport of the mobile station (11 or 111), if the vehicle 90 is located within the mobile station.

When a vehicle 90 is not actively going into or out of the mobile station 11, the door may be closed by an actuator 56 and secured by a latch, lock, or other mechanical fastener. The retooling or payload loading may be done inside the mobile station 11 with door shut and locked to provide a significant safety feature. Having the payloads inside the mobile station (11 or 111) protects them (and the vehicle 90 from the elements to extend service life and resale value of the equipment.

Figure 7:
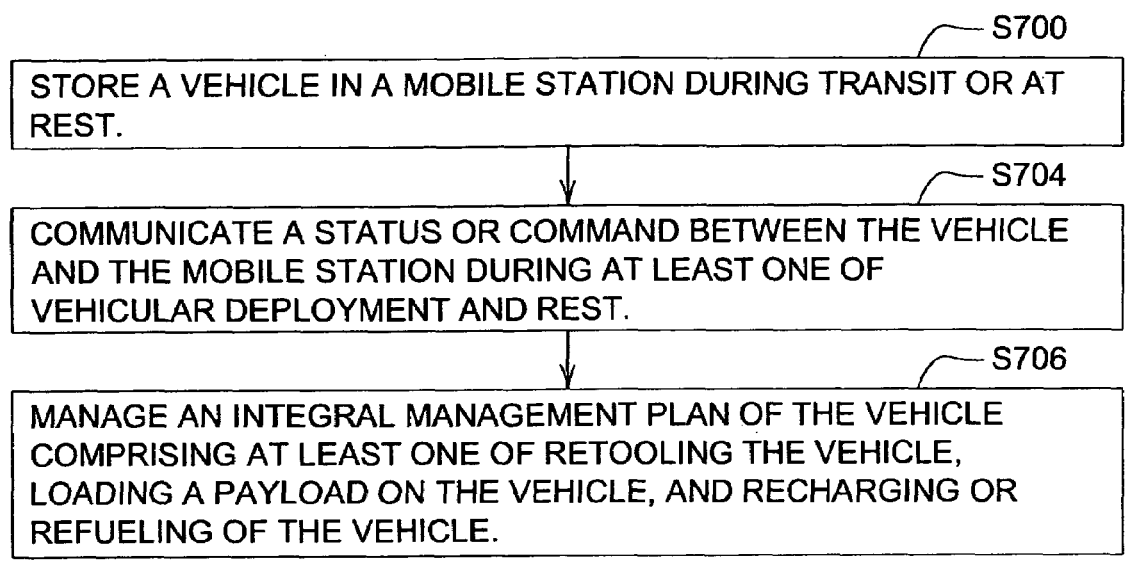
FIG. 7 is a flow chart of a method for operating an unmanned vehicle associated with a mobile station.

FIG. 7 illustrates a method for operating a manned vehicle. The method of FIG. 7 begins in step S700.

In step S700, a vehicle is stored in a mobile station (11 or 111) during transit or at rest. During transit, an unmanned vehicle 90 is secured to an interior of the mobile station (11 or 111) to prevent movement of the vehicle with respect to the mobile station (11 or 111) during the shipment of the mobile station (11 or 111) to a destination. During a period of rest, the unmanned vehicle 90 may be stored within the interior of the mobile station (11 or 111) to protect the mobile vehicle from foul weather, the elements, vandalism or other security risks.

In step S704, vehicle electronics of the vehicle and station electronics (10, 110) of the mobile station (11 or 111) cooperate to facilitate communications. A status or command is communicated between the vehicle and the mobile station (11 or 111) during at least one of vehicular deployment and rest.

In step S706, a station controller 16 or station electronics (10 or 110) manages a integral management plan of the vehicle comprising at least one of retooling the vehicle, loading a payload on the vehicle, and recharging or refueling of the vehicle. The method of step S706 may be carried out in accordance with various procedures, which may be applied individually or cumulatively.

In accordance with a first procedure, at the beginning of the execution of a management plan, the station controller 16 may direct the retooling system 403 of the vehicle to couple a particular transportable module 75 to the vehicle that is required for a task within the management plan.

In accordance with a second procedure, at any time in the management or after the completion of a first task, the vehicle electronics 50 or the station controller 16 may recall the vehicle from the field via a wireless communication to the mobile station (11 or 111) where a first transportable module 76 applicable to a first task is exchanged for a second transportable module 77 applicable to a second task. The exchange is accomplished by decoupling one transportable module 75 and coupling another transportable mobile 75. The implement connection sensor 62 may provide an implement identifier that uniquely identifies each transportable module 75 or implement. The implement identifier may be forwarded within the vehicle electronics (50 or 150) to the first wireless communications device 66 to the second wireless communications device 20 at the station electronics (10 or 110).

Under a third procedure, at the beginning of the execution of a management plan, the station controller 16 may direct the loading system 402 to load a payload 406 on the vehicle or within a container associated with the vehicle.

Under a fourth procedure, vehicle electronics (50 or 150) or the station controller 16 may recall the vehicle from the field via wireless communication to the mobile station where the payload level sensor 58 on the vehicle indicates that the payload on the vehicle is below a minimum threshold via a payload level status message. The payload level status message may be forwarded within the vehicle electronics (50 or 150) to the first wireless communications device 66 to the second wireless communications device 20 at the station electronics (10 or 110).

Under a fifth procedure, at the beginning of the execution of a management plan, the station controller 16 may direct the recharging system 401 or refueling system to recharge or refuel on the vehicle.

Under a sixth procedure, the vehicle electronics (50 or 150) or the station controller 16 may recall the vehicle from the field via a wireless transmission to the mobile station where the energy level sensor 60 (e.g., fuel or charge level sensor) on the vehicle indicates that the energy level on the vehicle is below a minimum energy level threshold via a energy level status message. The energy level status message may be forwarded within the vehicle electronics (50 or 150) to the first wireless communications device 66 to the second wireless communications device 20 at the station electronics (10 or 110).

Under any of the foregoing procedures of step S706, the status of the vehicle may be monitored or a performance of an agricultural management plan is monitored for a designated field. For example, the vehicle electronics may transmit information wirelessly to the station electronics (10, 110), which relays or forwards the transmitted information to a user terminal via a communications network.

Figure 8:
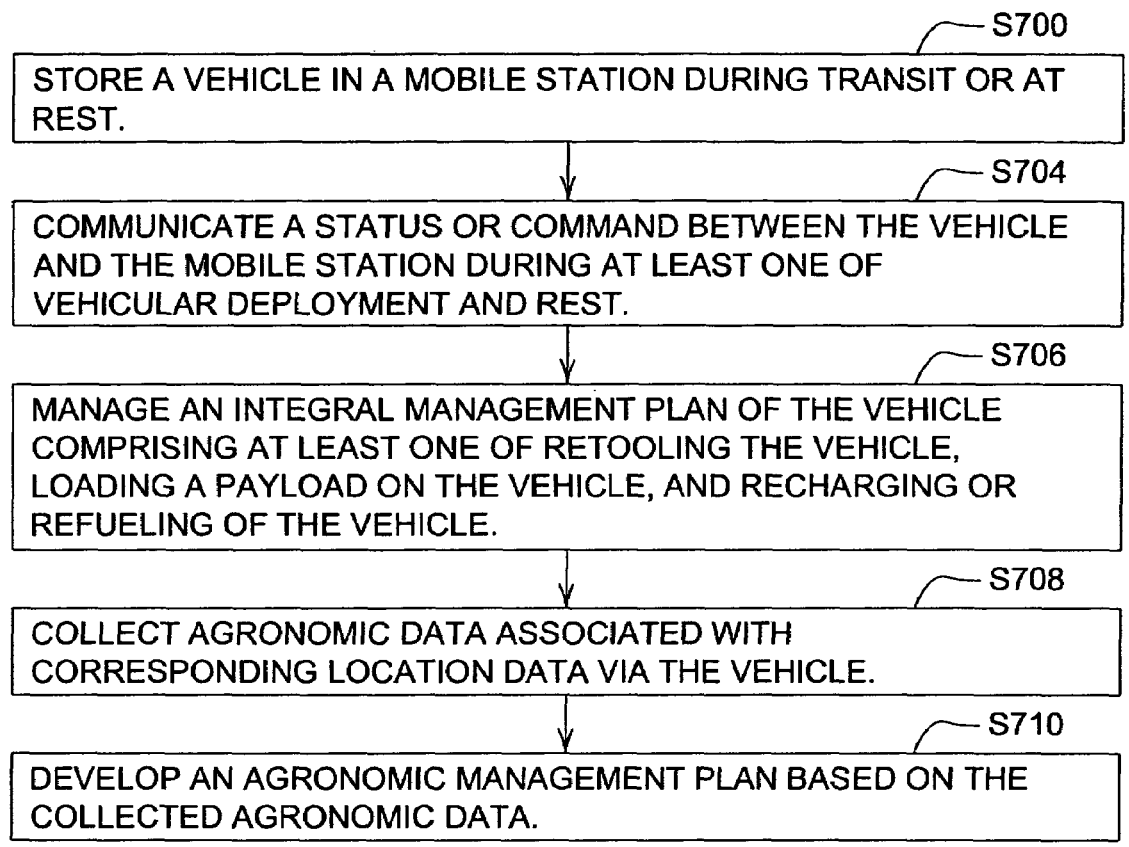
FIG. 8 is a flow chart of another method for operating an unmanned vehicle associated with a mobile station.

The method of FIG. 8 is similar to the method of FIG. 7, except the method of FIG. 8 includes additional steps S708 through S710. Like reference numbers in FIG. 7 and FIG. 8 indicate like elements. Steps S700 through S706 are discussed in conjunction with FIG. 7.

In step S708, which may follow step S706, a sensor collects agronomic data associated with corresponding location data via the vehicle. The sensor may comprise a soil moisture sensor 176, the plant disease sensor 177, the nutrient uptake sensor 178 or the insect detector 179. The sensor may collect one or more of the following types of agronomic data: soil moisture data, images of plant tissue (e.g., leaves), magnified images of plant tissue, genetic test results for the presence of certain marker sequences of deoxyribonucleic acid, nitrogen level or nitrate level for plant tissue, nutrient level for plant tissue, nutrient level for soil sample, chlorophyll level for plant tissue, and acoustic data on insects, and other agronomic data. Further, the location-determining receiver 410 may associate the collected agronomic data with corresponding location data.

In step S710, a plan manager or end user terminal 26 develops an agronomic management plan or agricultural management plan based on the collected agronomic data. The agronomic management plan may comprise applying irrigation to compensate for a detected water deficiency, applying a nutrient (e.g., nitrogen or fertilizer) to compensate for a detected nutrient deficiency, applying a microbicide or fungicide to treat a detected plant disease or pathogen, and applying an insecticide to treat a detected infestation of harmful insects attacking a crop.

The methods of FIG. 9 through FIG. 13 illustrate various techniques for collecting agronomic data and development an agronomic management plan based on the agronomic data. Accordingly, the methods of FIG. 9 through FIG. 13 may follow steps S700 through S706 of FIG. 7, much in the same way as steps S708 through S710. However, the methods of FIG. 9 through FIG. 13 may also stand on their own as independent methods for crop surveillance or scouting that may be executed generally by an unmanned vehicle 90 or an unmanned vehicle 90 that is deployed from a mobile station (11 or 111).

Figure 9:
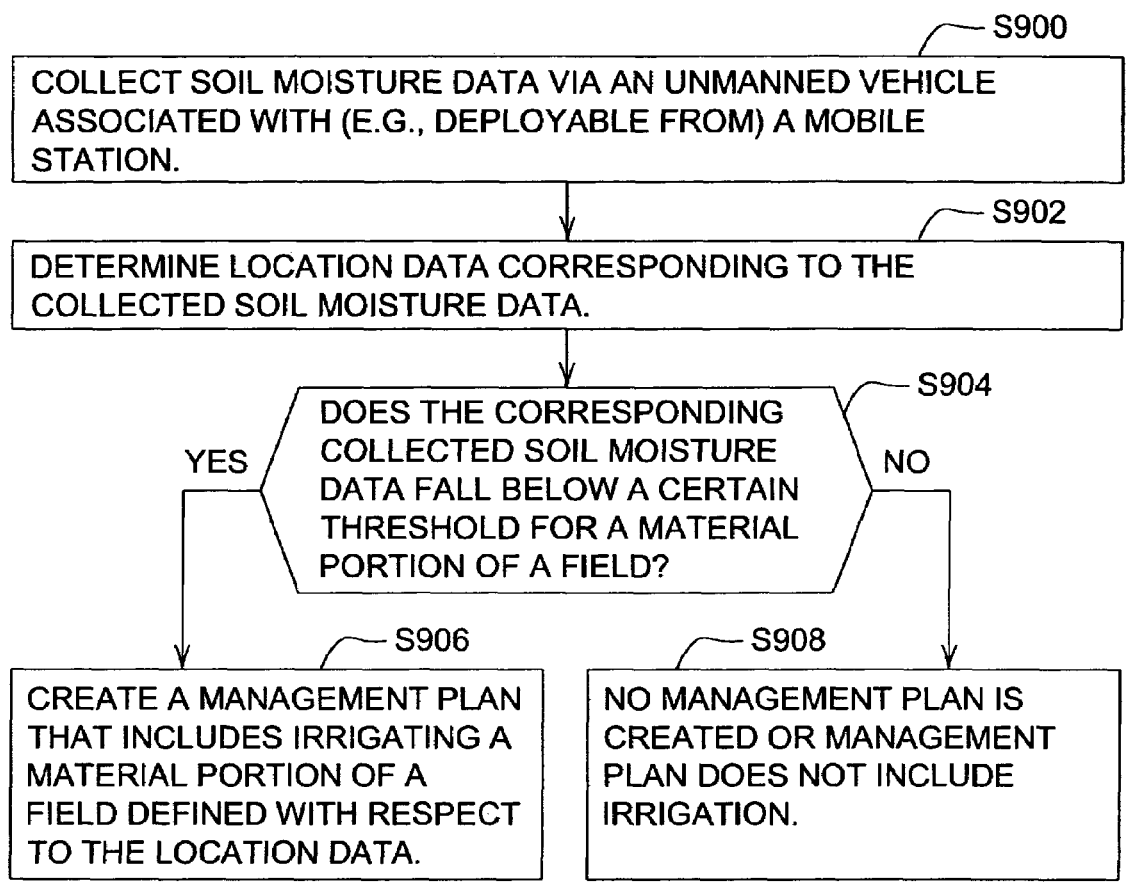
FIG. 9, FIG. 10, FIG. 11, FIG. 12 and FIG. 13 are flow charts of various embodiments of methods for creating a management plan based on agronomic information.

The method of FIG. 9 begins in step S900.

In step S900, a soil moisture sensor 176 collects soil moisture data via an unmanned vehicle 90 associated with (e.g., deployable from) a mobile station (11 or 111).

In step S902, the location-determining receiver determines respective location data for the corresponding collected soil moisture data. Steps S900 and S902 may be executed simultaneously, sequentially, or in any other order.

In step S904, the management planner 12, the station electronics (10, 110), or the end user terminal 26 determines if the corresponding collected soil moisture data falls below a certain threshold for a material portion of the field. If the corresponding collected soil moisture data falls below the certain threshold for a material portion of the field, the method continues with step S906. However, if the corresponding collected soil moisture data does not fall below the certain threshold, the method continues with step S908.

In step S906, the management planner 12, the station electronics (10, 110), or the end user terminal 26 creates an agronomic management plan that includes irrigating a material portion of the field defined with respect to the location data.

In step S908, the management planner 12, the station electronics (10, 110), or the end user terminal 26 creates no agronomic management plan or the agronomic management plan does not include irrigation.

Figure 10:
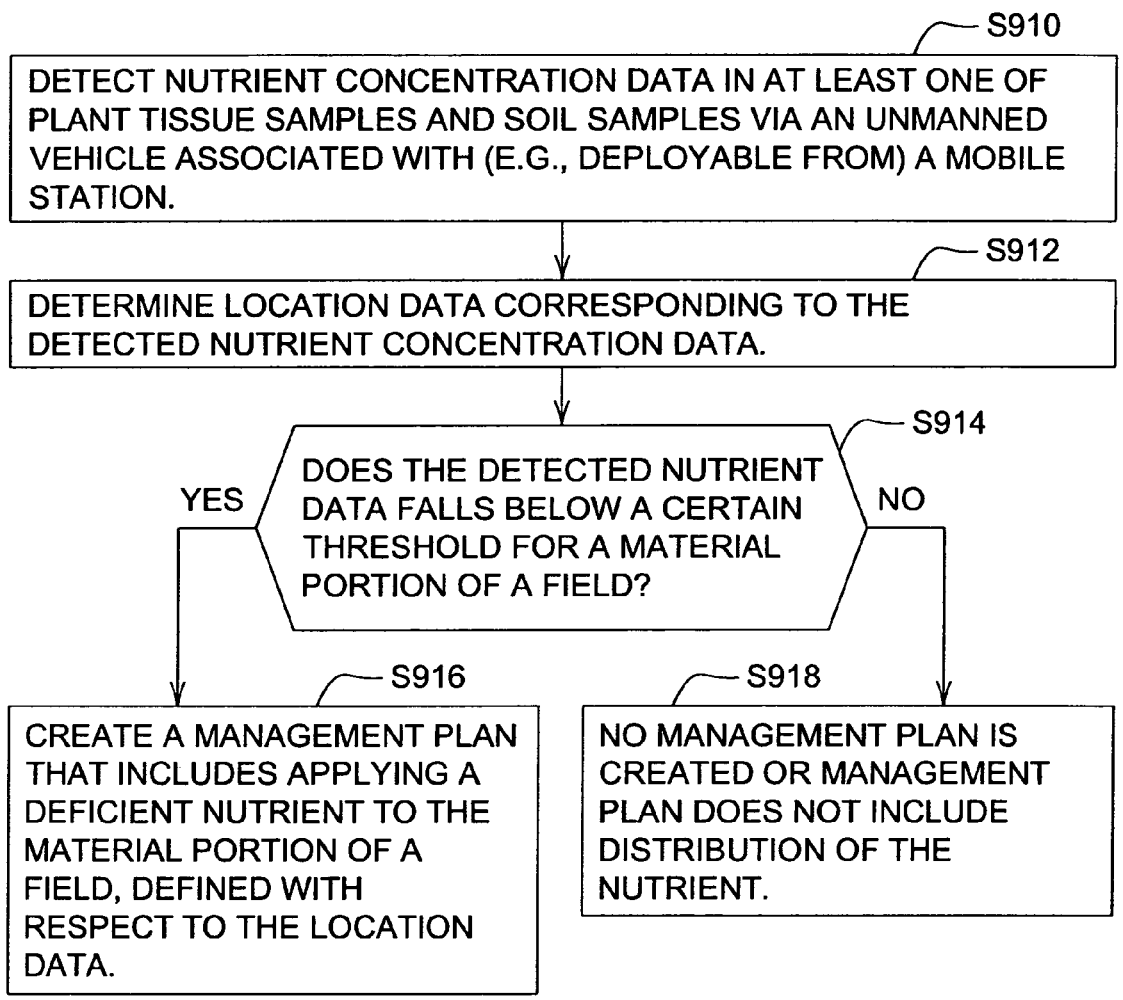

The method of FIG. 10 begins in step S910.

In step S910, a nutrient uptake sensor 178 detects nutrient concentration data in at least one of plant tissue samples and soil samples via an unmanned vehicle 90 associated with (e.g., deployable from) a mobile station (11 or 111). The nutrient uptake sensor 178 may comprise a nitrogen sensor, a nitrate sensor, a chlorophyll level detector, or another sensor or test equipment.

In step S912, the location-determining receiver determines location data corresponding to the collected nutrient concentration data. Steps S910 and S912 may be executed simultaneously, sequentially, or in any other order.

In step S914, management planner 12, the station electronics (10, 110), or the end user terminal 26 determines whether the collected nutrient data falls below a certain threshold for the material portion. If the detected nutrient level falls below a certain threshold, then the method continues with step S916. However, if the detected nutrient level does not fall below a certain threshold the method continues with step S918.

In step S918, the management planner 12, the station electronics (10, 110), or the end user terminal 26 does not create an agronomic management plan or the agronomic management plan does not include distribution of a nutrient based on the detected nutrient concentration data.

Figure 11:
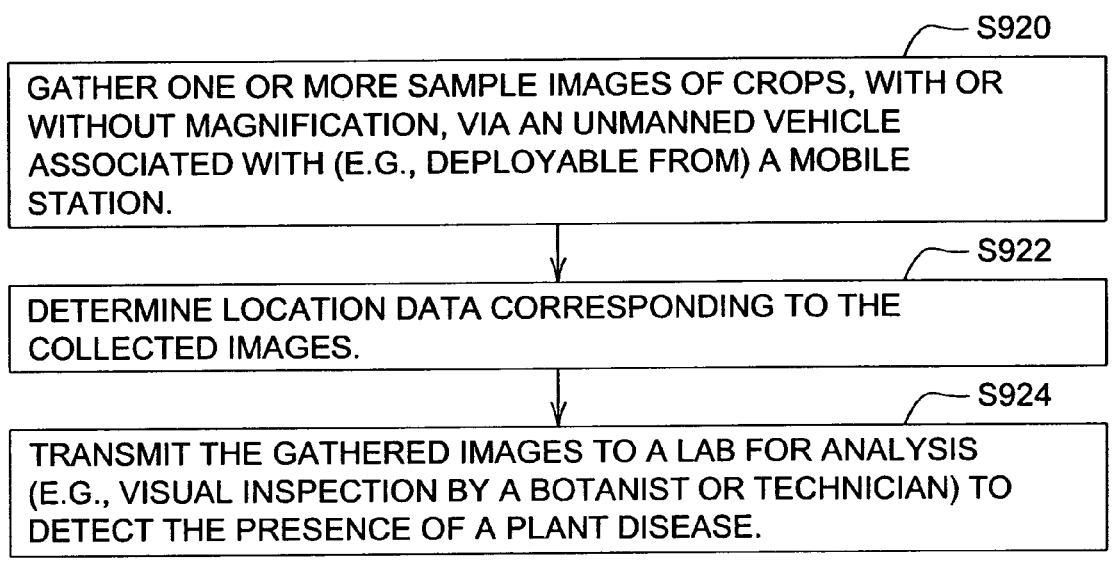

The method of FIG. 11 begins in step S920.

In step S920, a plant disease detector or imaging device gathers one or more sample images of crops, with or without magnification, via an unmanned vehicle 90 associated with (e.g., deployable from) a mobile station (11 or 111).

In step S922, a location-determining receiver located on the unmanned vehicle 90 determines location data corresponding to the collected images. Step S922 may be executed simultaneously, serially, or otherwise with respect to step S920.

In step S924, a communications interface or station electronics (10, 110) transmits the gathered images to a lab for analysis to detect the presence of a plant disease.

In an alternative embodiment, the transmission of data to the lab is optional in step S924, where a local image processing system added to the station electronics or the vehicle electronics makes a local determination or diagnosis of the collected images with a desired degree of certainty or reliability based on reliability parameters. The reliability parameters may depend upon one or more detected image features (e.g., color, hue, brightness and/or intensity of pixels) of a reference image substantially conforming to one or more reference image features (e.g., color, hue, brightness and/or intensity of pixels) of reference images indicative of a particular condition.

Figure 12:
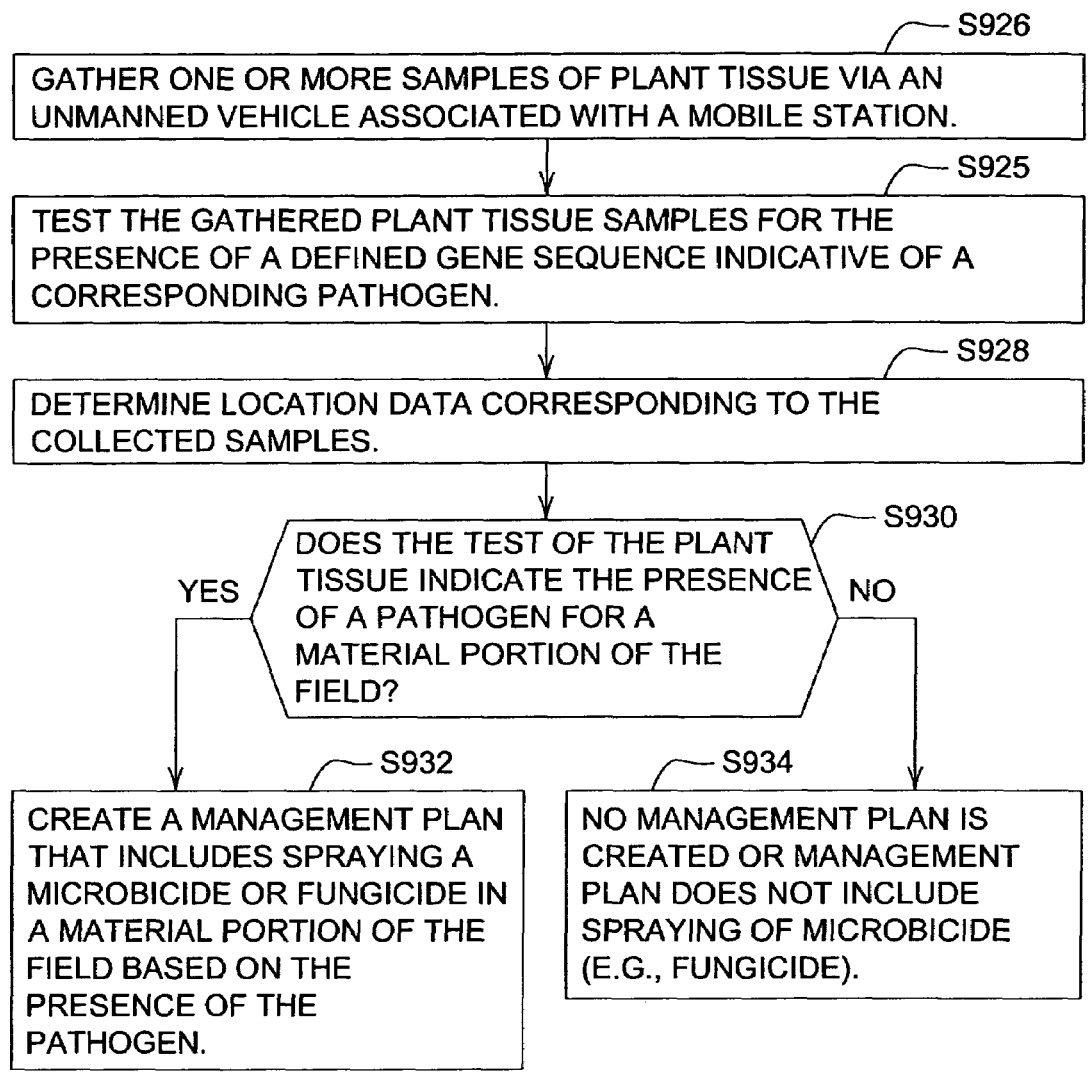

The method of FIG. 12 begins in step S926.

In step S926, a disease detector or a collector of the unmanned vehicle 90 gathers one or more samples of plant tissue. The unmanned vehicle 90 is associated with (e.g., deployed from) a mobile station (11 or 111).

In step S925, the disease detector or tester tests the gathered plant tissue samples for the presence of a defined gene sequence (e.g., DNA sequence) indicative of a corresponding pathogen.

In step S930, the disease detector or an analyzer determines whether the test of the plant tissue is indicative of the presence of a pathogen. The presence of certain proteins, gene sequences, or deoxyribonucleic acid (DNA) sequences indicative of a plant pathogen (e.g., bacteria, fungus or virus.) For instance, the disease detector, analyzer or sensor may comprise a device for conducting a polymerase chain reaction (PCR) to detect nucleic acid or an identifiable DNA sequence from a pathogen (e.g., for detection of crop pathogens such as Asian Soybean Rust). If the test of the plant tissue indicates a pathogen is present, the method continues with step S932. However, if the test of the plant tissue indicates that the pathogen is not present, the method continues with step S934.

In step S932, the management planner 12, the station electronics (10, 110), or the user terminal creates an agronomic management plan that includes spraying a microbicide or fungicide in a material portion of the field based on the presence of the pathogen.

In step S934, the management planner 12, the station electronics (10, 110), or the user terminal does not create an agronomic management plan or the agronomic management plan does not include the spraying or distribution of microbicide (e.g., fungicide) for the pathogen.

In an alternative embodiment, the process of FIG. 12 is repeated and a test is completed for other types or strains of a pathogen.

Figure 13:
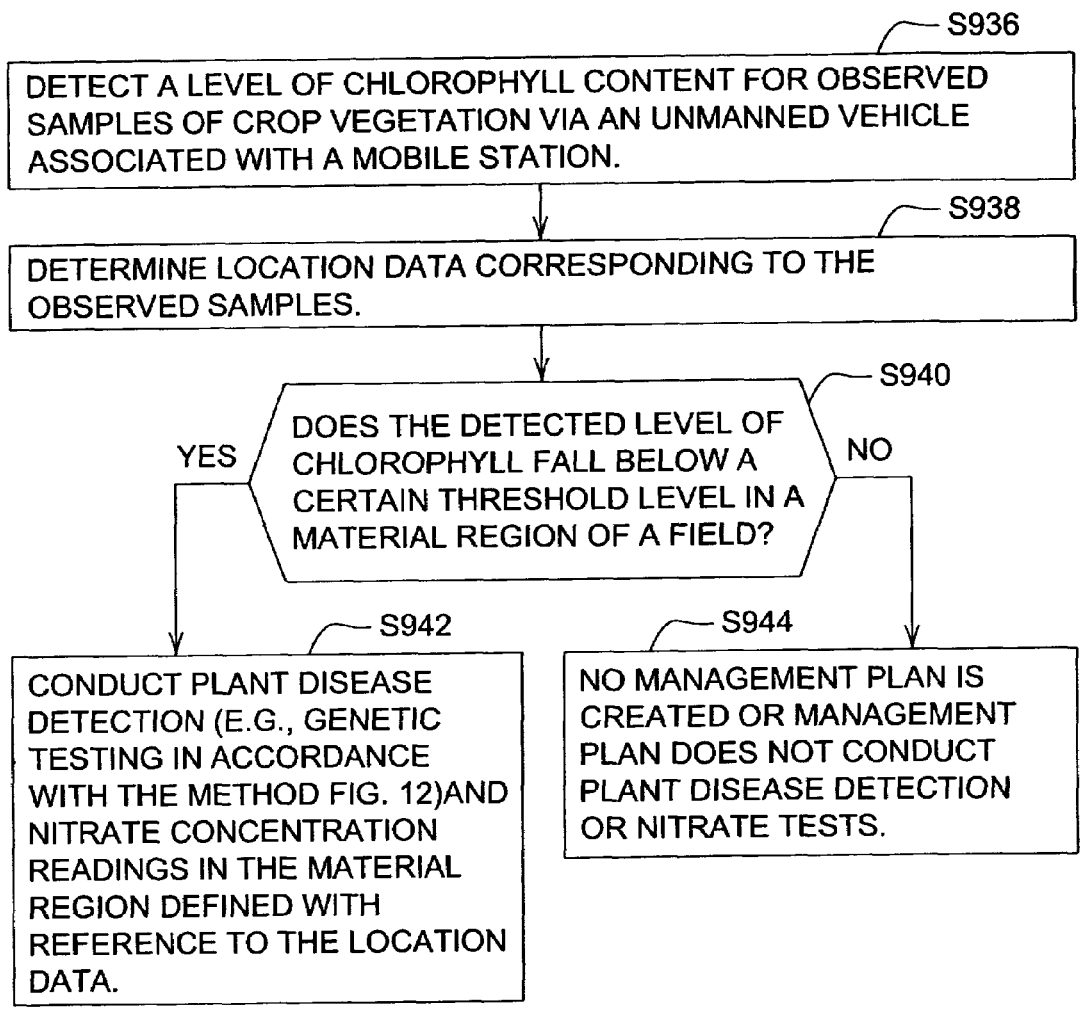

The method of FIG. 13 begins in step S936.

In step S936, a chlorophyll sensor detects or estimates a level of chlorophyll content for observed samples of crop vegetation via an unmanned vehicle 90 associated with a mobile station (11 or 111).

In step S938, a chlorophyll sensor determines whether the detected level of chlorophyll falls below a certain threshold level in a material region of a field. If the chlorophyll sensor determines that the detected level of chlorophyll (e.g., an average detected level or mean level across multiple observed samples) falls below a certain threshold, the method continues with step S942. However, if the chlorophyll sensor determines that the detected level of chlorophyll is greater than or equal to the certain threshold, then the method continues with step S944.

In step S944, the management planner 12 and the station electronics (10, 110) do not create management plans and does not conduct plant disease detection or nitrate tests.

Although the above description primarily provides examples of using the mobile station for an unmanned vehicle in the agricultural context to faciliate a agricultural management plan, the mobile station for an unmanned vehicle may be useful for construction applications, such as soil movement, material transport, material removal, terrain sculpting, road construction, canal construction, or airport runway construction. With regards to turf care applications, the mobile station for an unmanned vehicle may be applied to mowing, grass removal, debris removal, spraying, sand trap raking, greens maintenance, fairway maintenance, fallen leave removal, and trash removal, among other possible applications. With regards to military applications, the mobile mobile station may be applied to military supply, military resupply, scouting missions, surveillance missions, ordinance disposal, hazardous material collection, inspections for hazardous materials or bio-hazards, and land-mine sweeping and detection, and environmental remediation.

Having described the preferred embodiment, it will become apparent that various modifications can be made without departing from the scope of the invention as defined in the accompanying claims.

The invention claimed is:

1. A mobile station for supporting a deployment of unmanned vehicles, the mobile station comprising:
   a vehicle that secures to an interior of the mobile station during transit of the mobile station, the vehicle being unmanned and comprising vehicle electronics;
   a revolving storage device storing transportable modules that include payloads and implements associated with the payloads;
   a retooling system coupled to the revolving storage device that supports a switching of the implements associated with the payloads;
   a station electronics module comprising a station controller and a management planner, the management planner creating a management plan based on data that is collected by the vehicle electronics, the station controller managing the management plan created by the management planner for the vehicle, wherein the management plan includes an agronomic management plan.

2. The mobile station according to claim 1, wherein the station electronics module further comprises:
   a first wireless communications device in the vehicle electronics that transmits the management plan to a second wireless communications device in the station electronics module.

3. The mobile station according to claim 1, wherein the vehicle electronics comprises a plan manager that couples and decouples at least one implement to perform a particular task consistent with the agronomic management plan.

4. The mobile station according to claim 1, wherein the agronomic management plan includes agricultural data associated with planting, growing, harvesting and crop management.

5. The mobile station according to claim 1, wherein the vehicle electronics further comprises a soil moisture sensor including metallic probes that measure a volumetric water content of soil by transmission and reception of electromagnetic energy into the soil.

6. The mobile station according to claim 5, wherein the agronomic management plan further comprises at least one of irrigating a certain portion of a field, applying a fertilizer payload, conducting genetic tests, disbursing fungicide to material portion of a field having a low chlorophyll content.

7. The mobile station according to claim 1, wherein the payloads include one or more crop inputs selected from the group consisting of seed, fertilizer, herbicides, fungicides, miticides, pesticides, water, nutrients, trace minerals, nitrogen, potassium, phosphorus, and chemicals.

8. The mobile station according to claim 1, further comprising a loading system that comprises at least one of a pneumatic loading system, an auger loading system, a gravity-fed loading system, and a belt loading system, to load the payloads on the vehicle.

9. The mobile station according to claim 2, wherein the
   management planner determines information including an implement plan, a payload plan, a refueling plan, and a path plan, that is transmitted from the second communications device to the first wireless communications device.

10. The mobile station according to claim 1, the electronics module further comprising:
 a vehicular guidance system comprising: a location-determining receiver that determines a location of the vehicle outside of the mobile station based on a global positioning system receiver; an optical positioning system that determines position data for the vehicle within an interior of the mobile station with reference to at least one of a recharging system, a loading system, and a retooling system; and a guidance data processing module including an obstacle detection module that guides the vehicle in accordance with a plan path.

11. The mobile station according to claim 1 further comprising:
 a container for storing a payload for disbursement in a designated field in accordance with an agricultural management plan.

12. The mobile station according to claim 1, further comprising:
 a security manager comprising
 an identification and authentication system that opens the door of the mobile station upon receipt of a vehicle identifier transmitted by the vehicle.

13. The mobile station according to claim 12, wherein the security manager further comprises an intrusion detection system that determines whether an intrusion event has occurred and reports the intrusion event to an end user via a communications network, the intrusion event comprising a person or entity violating a boundary or perimeter of the mobile station.

14. The mobile station according to claim 1 further comprising:
 a first coupling unit attached to the vehicle;
 a second coupling unit attached to a transportable module and engagable with the first coupling unit, wherein the transportable module comprises at least one of an implement, a tool, a payload, and a crop input.

15. The mobile station according to claim 14 further comprising:
 a storage assembly for storing a group of transportable modules and generally aligning the first coupling unit with the second coupling unit by rotation or other movement of the storage assembly.

16. The mobile station according to claim 1, further comprising a recharging system that recharges the vehicle with electrical energy.

17. The mobile station according to claim 1 wherein the mobile station comprises a shipping container, and wherein the vehicle is secured to an interior portion of the mobile station.

* * * * *